March 24, 1964 A. M. THOMPSON 3,126,022

PORTABLE MANICURE CABINET

Filed March 30, 1961 4 Sheets-Sheet 1

INVENTOR:
ARNOLD M. THOMPSON
BY Norman R. Gerlach
ATT'Y

PORTABLE MANICURE CABINET

Filed March 30, 1961 4 Sheets-Sheet 2

INVENTOR:
ARNOLD M. THOMPSON
BY [signature]
ATT'Y

March 24, 1964 A. M. THOMPSON 3,126,022

PORTABLE MANICURE CABINET

Filed March 30, 1961 4 Sheets-Sheet 3

INVENTOR:
ARNOLD M. THOMPSON
BY

ATT'Y

March 24, 1964 A. M. THOMPSON 3,126,022
PORTABLE MANICURE CABINET
Filed March 30, 1961 4 Sheets-Sheet 4

INVENTOR:
ARNOLD M. THOMPSON
BY [signature]
ATT'Y 3,126,022

PORTABLE MANICURE CABINET

Arnold M. Thompson, Wheaton, Ill., assignor to Thompson Designs, Inc., Franklin Park, Ill., a corporation of Illinois Filed Mar. 30, 1961, Ser. No. 99,468
18 Claims. (Cl. 132—79)

The present invention relates to manicure cabinets and has particular reference to a portable cabinet having associated therewith means for enclosing and concealing a complete complement of manicure implements and cosmetics, as well as an electrically powered nail polish drying lamp, and for rendering such instrumentalities easily and conveniently available for use when required.

It is among the general objects of the present invention to provide a manicure cabinet of this type which is extremely compact and will retain the various instrumentalities associated therewith in a novel nested condition wherein they consume very little space, thus making it possible to construct the cabinet so that its overall size is small, considering the amount of equipment which it will accommodate. Another general object of the invention is to provide a manicure cabinet which is attractive in its appearance and pleasing in its design.

A specific object of the invention in a manicure cabinet of this general character is to provide a novel combination of a cabinet shell and a lamp-supporting bracket, the latter being movable from an extended position wherein the combined heat and illuminating lamp carried thereby overlies a table surface provided on the cabinet in operative nail-drying position to a retracted position wherein a portion of the bracket constitutes, in effect, a continuation of the shell and, in combination therewith, completes the closed outline or contour of the cabinet as a whole.

A similar and related object of the invention is to provide a novel shell and bracket combination as briefly outlined above wherein the lamp-supporting bracket when moved from its retracted position to its operative position uncovers a cord-enclosing compartment within which the electric lead-in cord for the heat lamp is normally housed, thus rendering the cord accessible for plug-in purposes.

A still further object of the invention is to provide such a cabinet wherein the lamp-supporting bracket when extended for use is capable of adjustment toward and away from the finger-supporting table surface to vary the intensity of the heat rays delivered for nail-drying purposes, the adjustment being made in an easy and simple manner by merely manually raising or lowering the bracket and without necessitating the use of tools or the loosening of fastening devices.

Yet another object of the invention is to provide a compartmented cabinet having slidable drawers associated therewith, together with novel latching means whereby the drawers may be releasably maintained in their closed position.

Another object of the invention is to provide such a cabinet wherein one of the drawers has associated therewith an individual closure slide, the latter being formed with finger rests so that when the drawer is pulled out to its extended position with the closure slide in place and closing the drawer, the drawer and slide assembly contitutes a finger support and the slide presents an auxiliary table surface for finger-steadying purposes during manicure operations such as the application of nail polish, the trimming of cuticle, the filing of nail edges, and the like, such table surface lying outside the realm of heat radiation issuing from the heat lamp but lying within the realm of illumination.

An additional object of the invention is to provide a compartmented cabinet of this character having slidable drawers associated therewith and in which one of the drawers itself is compartmented in a novel manner by means of partitions which are capable of being selectively positioned within the drawer body in such a manner as to vary the size of the individual compartments defined by the partitions thus enabling different size articles such as bottles and the like to be more effectively housed and maintained against undue displacement within the cabinet during transportation.

Numerous other objects and advantages of the invention, not at this time enumerated, will readily suggest themselves as the following description ensues.

In the accompanying four sheets of drawings forming a part of this specification, one illustrative embodiment of the invention has been shown.

Figure 1:
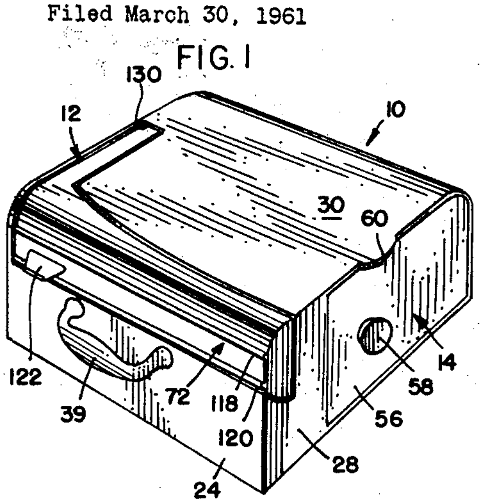
FIG. 1 is a front perspective view of a portable manicure cabinet constructed in accordance with the principles of the present invention and showing the same in its closed or collapsed condition.

Referring now to the drawings in detail and in particular to FIGS. 1 to 4 inclusive, the manicure cabinet disclosed in the drawings constitutes a preferred embodiment of the invention and it is comprised of two principal parts including a unitary cabinet shell 10 and a lamp-supporting bracket assembly 12 which will be referred to hereinafter simply as the lamp-supporting bracket. The cabinet shell 10 is shown in detail in FIG. 4 while the bracket 12 is shown in detail in FIGS. 5 to 8 inclusive. The cabinet further includes a relatively large compartmented drawer 14 and a relatively small non-compartmented drawer 16, the shell 10 being suitably partitioned, as will be described presently to slidably receive the two drawers for extension and retraction thereof in the usual manner of drawer operation. The drawer 16 has associated therewith a combined closure slide and finger rest 17, the nature and function of which will be described subsequently.

Figures 5, 6, 7, 8:
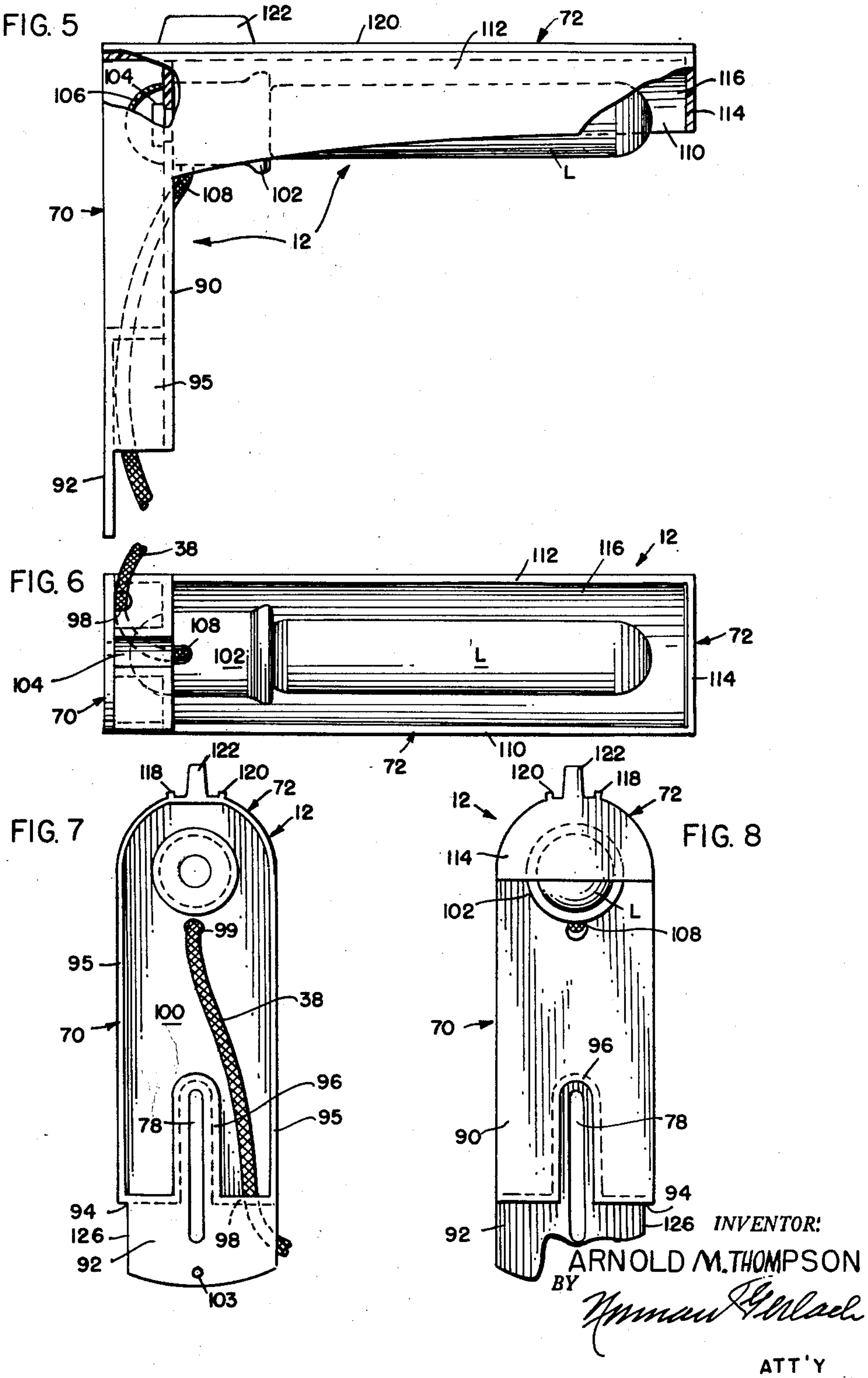
FIG. 5 is a side elevational view of the lamp-supporting bracket.
FIG. 6 is a bottom plan view of the lamp-supporting bracket.
FIG. 7 is a rear end elevational view of the lamp-supporting bracket.
FIG. 8 is a front end elevational view of the lamp-supporting bracket.

The cabinet shell 10 is of rigid unitary construction and box-like design. The shell includes a rectangular bottom wall 20 (FIG. 4), a full rear wall 22, a partial front wall 24, a full side wall 26, a partial side wall 28 (FIG. 5) and a partial top wall 30. The top wall 30 and rear wall 22 merge each into the other by means of a quarter-round wall section 32. A vertical partition wall 34 extends between the side walls 26 and 28, as well as between the top and bottom walls 30 and 20 respectively and divides the shell into a drawer-receiving compartment 36 and a lamp- and cord-receiving compartment 37, the latter compartment being adapted to receive therein in a folded condition a length of a two-wire electric cord associated with a heat lamp L including the usual plug-in connection for the cord. Only a fragment of the cord has been illustrated herein and designated at 38 (FIGS. 6 and 7). A carrying handle 39 projects forwardly from the front wall 24.

Figure 2:
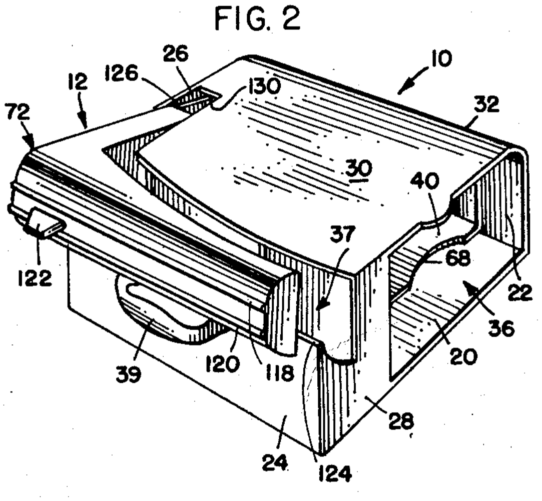
FIG. 2 is a front perspective view similar to FIG. 1 showing the cabinet in a preliminary unlatched condition preparatory to swinging the lamp-supporting bracket to an operative position and with one of the cabinet drawers removed to more clearly reveal the nature of the invention.
Figure 10:
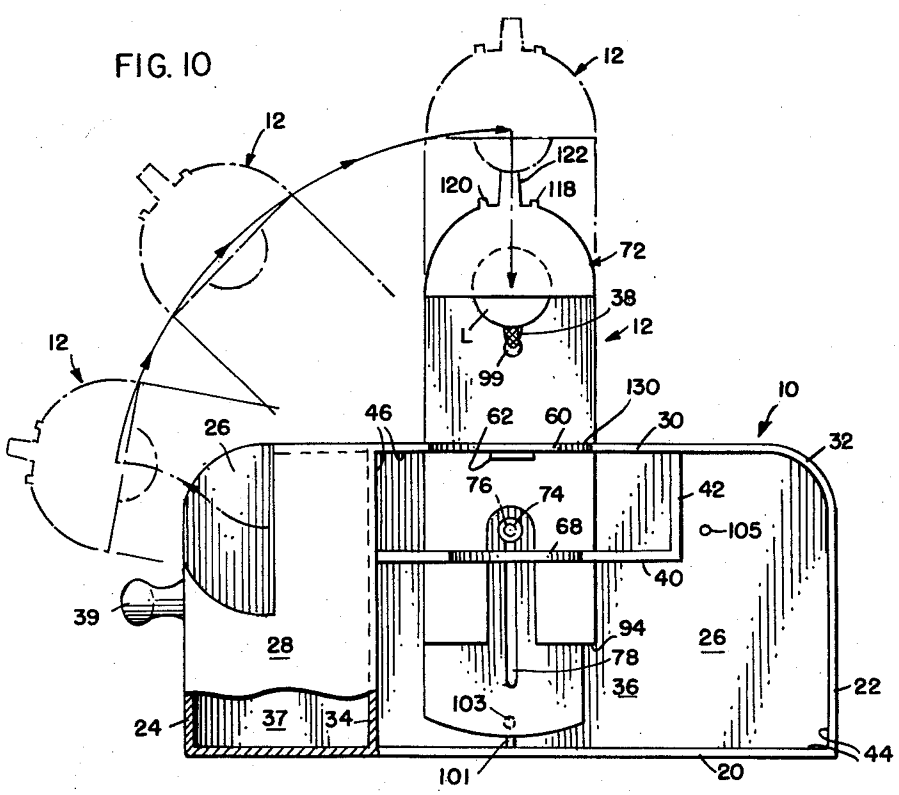
FIG. 10 is a side elevational view similar to FIG. 9 showing the cabinet in its operative position of use with the lamp-supporting bracket extended.
Figure 9:
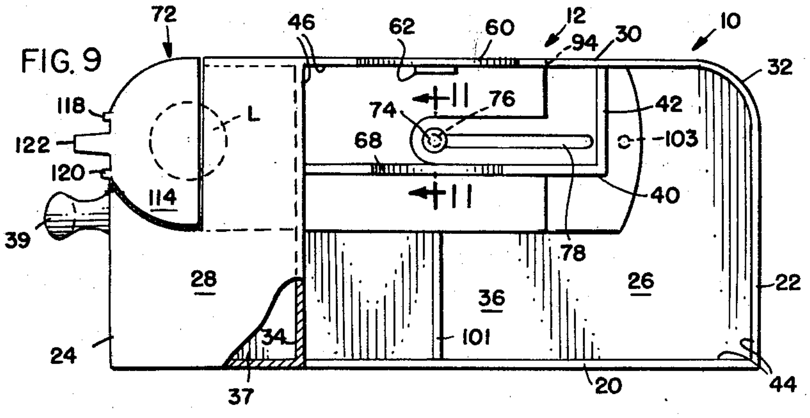
FIG. 9 is a side elevational view of the manicure cabinet showing the same in its closed or collapsed condition with the cabinet drawers removed.
Figure 12:
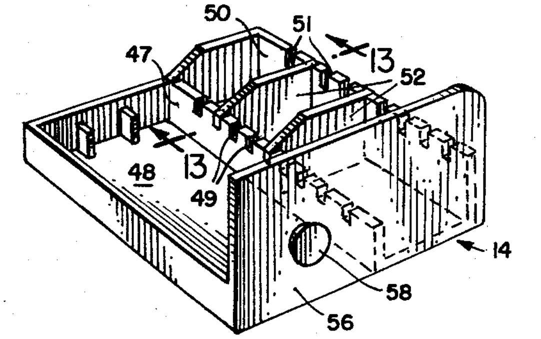
FIG. 12 is a perspective view of one of the cabinet drawers.
Figure 13:
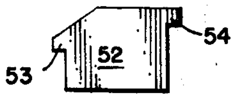
FIG. 13 is a plan view of a drawer partition employed in connection with the invention.
Figure 14:
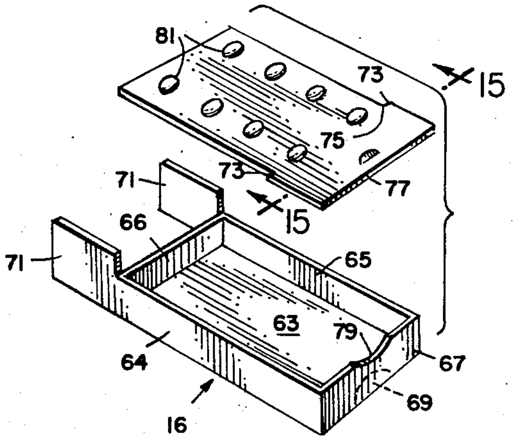
FIG. 14 is an exploded perspective view of another cabinet drawer and a closure slide therefor.
Figure 15:
FIG. 15 is a sectional view taken substantially on the vertical plane indiacted by the line 15—15 of FIG. 14.

Referring now to FIGS. 2, 9 and 10, a horizontal drawer support 40 and a vertical drawer sill 42 divide the compartment 36 into two drawer guides 44 and 46 respectively, the former being adapted slidably to receive therein the large drawer 14 (FIG. 12) and the latter being adapted to receive therein the small drawer 16 (FIG. 14). The drawer 16 may be employed for housing various manicuring implements or accessories as, for example, cotton tipped swabs, emery boards, nail files, cuticle scissors, nail-white pencils, orangewood sticks and the like. The drawer 14 is provided with a partition wall 47 which affords a large compartment 48 for enclosing or housing a package-type manicuring kit, including a battery operated motor and accessories therefor of the type shown and described in United States Patent No. 2,861,578, dated November 2, 1958 and entitled "Utility Cabinet Assembly." The upper edge of the partition wall 47 is formed with a series of notches 49 and the side wall 50 remote from the compartment 48 is formed with a series of notches 51 in the upper edge thereof corresponding in number and spacing to the number and spacing of the notches 49. A series of removable partitions 52 (FIG. 13) extend across the space existing between the partition wall 47 and side wall 50, and are provided with ears 53 and 54 which are selectively receivable in the notches 49 and 51 respectively, so that these partitions may be selectively arranged to divide the aforementioned space into compartments of varying sizes according to the dictates of various articles, such as bottles of nail polish, polish remover, cuticle oil, etc., which are to be enclosed within this portion of the drawer 16.

The drawer 14 further includes a front drawer wall 56 and a drawer pull 58. The wall 56 forms a continuation of the partial side wall 28 (FIG. 1) of the cabinet shell 10 when the drawer is in its closed position within the shell.

As best seen in FIGS. 1, 3, 9 and 10, the side edge region of the top wall 30 is formed with a small laterally projecting ear 60 on the underneath side of which there is provided a depending drawer latch 62 designed for engagement with the upper edge of the drawer wall 56 when the drawer 14 is in its retracted closed position. The ear 60 constitutes a finger-grip by means of which the adjacent side margin of the top wall 30 may be flexed slightly upwardly to move the latch 62 out of the path of movement of the wall 56 and permit the drawer 14 to be slid outwardly in the drawer guide 44 to its open position. After the drawer 14 has thus been moved to its open position, the drawer 16 is accessible for manual manipulation.

Figure 3:
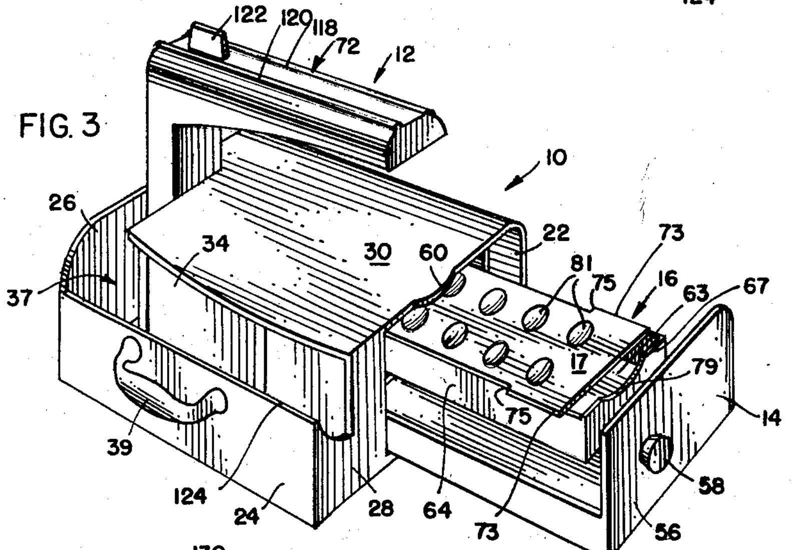
FIG. 3 is a front perspective view of the manicure cabinet similar to FIGS. 1 and 2 showing the same in an operative position of use with the lamp-supporting bracket and one of the cabinet drawers extended.
Figure 4:
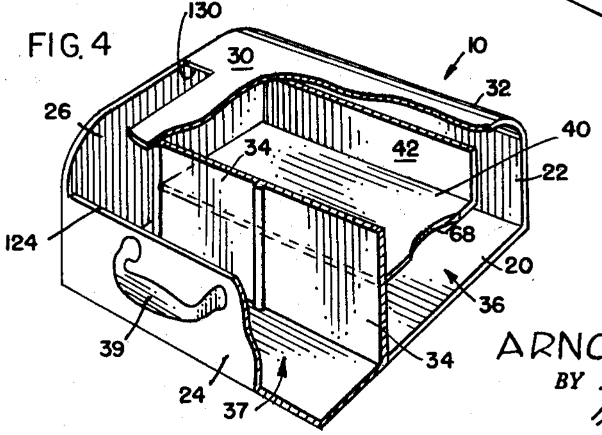
FIG. 4 is a front perspective view of the cabinet shell per se with the lamp-supporting bracket and drawers removed.

Referring now to FIGS. 3 and 14, the small drawer 16 is in the form of a shallow tray having a bottom wall 63, upstanding side walls 64 and 65, an upstanding rear wall 66 and an upstanding front wall 67. A cut-out 68 (FIGS. 2 and 4) in the horizontal drawer support 40 and a similar cut-out 69 in the bottom wall 63 facilitates manual engagement of the drawer for pull-out purposes. A pair of vertically disposed guides 71 extend rearwardly from the side margins of the rear wall 66 and serves to confine therebetween the previously mentioned combined closure slide and finger rest 17.

The closure slide and finger rest 17 is in the form of a flat plate-like member which is confined edgewise between the guides 71 and which slides upon the upper edge of the rear wall 66. The forward end region of the member is undercut to provide a pair of lateral supporting ears 73 which slide upon the upper edges of the side walls 64 and 65 respectively. The closure slide is movable between a retracted position wherein the shoulders 75 afforded by the ears 73 engage the forward edges of the guides 71, and an advanced position wherein the forward edge 77 of the slide engages the inside face of the upper edge region of the front wall 67. A cut-out 79 in the upper edge of the front wall 67 facilitates manipulation of the closure slide 17.

The upper face of the closure slide is formed with a series of four shallow concave depressions 81 arranged in alignment along each side edge of the slide. These depressions are provided for the purpose of receiving therein the ball portion of the fingers and provide rests for steadying the fingers during manicuring operations such as the filing of nails, the application thereto of nail polish, cuticle oil or the like. These depressions or finger rests 81 become accessible for use at such times as the drawer 16 is extended and the closure slide is in its closed or extended position over the upwardly facing drawer opening.

Referring now to FIGS. 5 to 8 inclusive, the lamp-supporting bracket 12 is generally of L-shape design and it includes a short arm 70 which constitutes a base support for the bracket as a whole, and a long arm 72 which constitutes a lamp shade and reflector and which also cooperates with the shell 10 to make up a portion of the cabinet exterior when the bracket is in its closed inoperative position on the shell. In its open or extended operative position as shown in FIG. 10, the bracket 12 lies in a vertical plane and the lamp proper L overlies the top wall 30 and is spaced upwardly therefrom a slight distance so that the upper face of the top wall 30 constitutes a working surface or table on which the fingers of the hand may be supported for nail-drying purposes under the influence of the heat generated by the lamp L. In its closed or inoperative position as shown in FIGS. 1 and 9, the bracket lies in a horizontal plane and the long arm 72 constitutes a closure for the previously mentioned cord-receiving pocket or compartment 37, as well as completing the cabinet outline where the shell is interrupted by virtue of the partial front wall 24. In this closed or inoperative position of the bracket 12, the lamp L is enclosed within the compartment 37 together with the cord 38 while one side of the short arm 70 completes the continuity of the top wall 30 as shown in FIG. 1.

Figure 11:
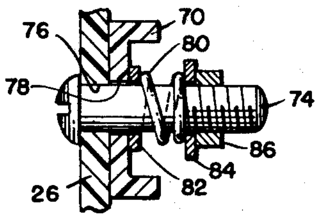
FIG. 11 is an enlarged sectional view taken substantially along the line 11—11 of FIG. 9.

The lamp-supporting bracket 12 is mounted for both sliding and swinging movement about the axis of a pivot pin assembly which may be in the form of a nut and bolt assembly, the bolt portion 74 of which (see also FIG. 11) passes through a small hole 76 formed in the side wall 26, as well as through an elongated longitudinally extending slot 78 formed in the bracket base support 70. A spring 80 disposed between a pair of washers 82 and 84 surrounds the shank of the bolt portion 74 and effectively bears at one end against a nut 86 and at its other end against the bracket base 70 to frictionally restrain the swinging and sliding movements of the bracket 12.

As best seen in FIGS. 5 to 8 inclusive, the short arm of bracket base 70 is of irregular design and it includes a relatively thick hollow or cup-shape proximate section 90 and a thin flat distal section 92. One side of the section 92 is relieved as at 94 for a purpose that will be made clear presently.

The previously mentioned elongated slot 78 through which the bolt 74 passes is formed in the thin section 92 and the continuous wall 95 of the cup-shape proximate section 90 is formed with a reentrant portion 96 which partially surrounds the slot 79 as shown in FIG. 7. The distal end region of the wall 95 is formed with a hole 98 therethrough to permit passage of the electric cord 36 leading to the lamp L. The cord 36 also passes through a hole 99 formed in the bottom wall 100 of the cup-shape section 90.

As best seen in FIGS. 9 and 10, the side wall 26 of the shell 10 is formed with an elongated vertical groove 101 therein on the inside face thereof and in vertical alignment with the hole 76. This groove 101 is designed for sliding cooperation with a small detent protuberance 103 formed on the thin section 92 of the short arm 70 of the lamp-supporting bracket 12. The groove and detent protuberance serve to maintain in the lamp-supporting bracket 12 in its vertical erected or extended condition in any of the selected positions of vertical adjustment of which the bracket is capable of assuming. A small detent socket 105 on the inside face of the wall 26 is in horizontal alignment with the hole 76. When the lamp-supporting bracket 12 is in its horizontal retracted position as shown in FIGS. 1 and 10, the detent protuberance 103 and detent socket 105 are in register so that the lamp-receiving bracket 12 is yieldingly maintained in such retracted position.

The lamp L is adapted to be screwed into a conventional threaded lamp socket fitting 102 having the usual socket shank 104. The end region of the cord projects through the hole 99 and is electrically connected in the socket fitting 102.

The lamp L is of conventional design and construction and is commercially available from numerous manufacturers. Despite its small size the lamp delivers a relatively high wattage, for example 40 watts, so that the lamp generates an appreciable amount of heat. Preferably the glass shell of the lamp L is of heat resistance material and is of non-colored frosted glass so that, in addition to the delivery of heat for nail drying purposes, an appreciable amount of illumination takes place to enable the operator to better observe the operation involved. If desired, the lamp L may radiate rays which emanate from the infra-red end of the spectrum.

The long arm 72 which constitutes the lamp shade or reflector portion of the bracket 12 is in the form of an elongated hood having side walls 110 and 112 and a distal end wall 114. A semi-cylindrical polished reflector proper 116 is nested within the cup-shaped hood and is substantially coextensive with the lamp L. As best seen in FIGS. 7 to 10 inclusive, the curved crown portion of the hood is formed with a pair of longitudinally extending elongated ribs 118 and 120 thereon, the purpose of which will appear presently. The curved crown portion of the hood is also formed with an outstanding finger lift 122.

In the use of the manicure cabinet assembly in the closed inoperative condition thereof, the bracket assembly 12 will assume the position wherein it is shown in FIGS. 1 and 10 with the plane of the L-shaped lamp-supporting bracket 12 extending horizontally and with the bracket nested within the voids existing by virtue of the incomplete front wall 24 and side wall 28. The end wall 114 fills in the void existing in the incomplete side wall 28 at the upper left hand corner region thereof as viewed in FIG. 10 while the side wall 112 of the hood 72 fills in the void existing in the top wall 30 along the entire bottom edge thereof as viewed in FIG. 4. The upper portion of the continuous wall 95 (FIGS. 5 and 7) fills in the void existing at the lower left hand region of the top wall 30 as viewed in FIG. 4. The rib 120 rests upon the upper horizontal edge 124 of the partial front wall 24 of the shell 10. The shank of the bolt 74 passes through the extreme left hand end of the elongated slot 78 as seen in FIG. 9. The relieved portion 94 (FIGS. 7 and 8) of the thin flat distal section 92 is filled by the adjacent portion of the top wall 30 so that the upwardly facing edge 126 of the relieved portion 94 bears upwardly against the inside or underneath side of the top wall 30 as shown in FIG. 10. At this time the detent protuberance 103 is disposed in the detent socket 105.

In this collapsed or closed position of the cabinet, the various manicure implements and accessories such as have previously been mentioned may be stored within the drawers 14 and 16 and the latter maintained shut to enclose them. When access to the interior of the drawer 14 is required, the drawer may be released for outward sliding movement on the drawer guide 44 by raising the latch-releasing finger lift 60 to flex the top wall 30 in the vicinity of the drawer latch 62, thus elevating the latch to a degree sufficient to cause it to move out of the path of movement of the upper edge of the drawer front wall 56, whereupon the drawer 14 may be slid bodily forwardly to its fully open position. Displacement of the drawer front wall 56 forwardly will render access to the small drawer 16 for opening purposes. The drawers 14 and 16 may thus be manipulated whether the lamp-supporting bracket 12 is in its retracted or its extended position.

It is to be noted at this point that in the collapsed or closed condition of the cabinet, the elongated rib 120 (FIG. 1) rests upon and is supported by the upper edge of the front wall 24 of the shell 10. The rib 118 apart from lending rigidity to the long arm 72 of the bracket 12 preserves the symmetry of design of the closed cabinet. The rib 120 thus prevents the long arm 72 of the bracket from working its way into the cord-receiving compartment 37.

In order to extend the lamp-supporting bracket 12 to an operative position, the lamp L which as shown in FIG. 10 partially underlies the forward edge of the top wall 30 of the shell 10, must be moved forwardly a slight distance so that it will clear this forward edge during upward swinging movement of the bracket 12. Accordingly, as shown in FIG. 2, before swinging the bracket bodily upwardly, it is necessary to pull the same forwardly to approximately the position wherein it is shown in FIG. 2, the finger lift 122 facilitating initial elevation of the long arm 72 or lamp shade portion of the bracket to such an extent that upon forward movement of the bracket this arm will clear the upper edge of the front wall 24. Such forward movement is permitted by virtue of the friction connection afforded by the pivot assembly shown in FIG. 11 and including the slot 78 in the short arm 70, the bolt 74 and the spring 80.

With the bracket 12 in the position wherein it is shown in FIG. 2, the lamp L and its socket fitting 102 will lie forwardly of the front edge of the top wall 30 so that the bracket may then be swung in a clockwise direction as viewed in FIGS. 2, 9 and 10, until such time as the general plane of the L-shaped bracket extends vertically. This clockwise swinging movement of the bracket 12 is limited by engagement of one side of the short arm 70 with the edge 130 (FIGS. 1, 2, 4 and 9) which exists by virtue of the interruption or void which is provided in the top wall 30 for reception of the short arm 70. In this position of the lamp-supporting bracket 12, the detent protuberance 103 is disposed in the vertical detent groove 101.

With the general plane of the lamp-supporting bracket 12 extending vertically as shown in FIG. 10, the bracket is free to be slid either upwardly or downwardly between the dotted and the full line positions illustrated in this view. The upper face on the top wall 30 constitutes a finger-supporting work table surface which directly underlies the lamp L. The compressive force of the spring 80 (FIG. 11) may be adjusted so that the bracket 12 may be slid upwardly or downwardly with comparative ease, the adjustment normally being made sufficiently loose so that an upward manual pull on the bracket will allow the bracket to slip without any tendency to lift the cabinet shell 10 from the surface on which it is supported. This provision for vertical adjustment of the lamp L is for the purpose of varying the intensity of heat rays emanating from the lamp and reaching the fingers during nail-drying operations.

At the time that the lamp-supporting bracket 12 is made available for use as described above, it will be convenient for the user to extend the small drawer 16 to the position shown in FIG. 3 while allowing the closure slide 17 to remain in its closed position on the drawer. The eight finger depressions 81 are thus available for selective placement of the ball portions of the fingers of either hand therein so that the fingers will be supported for manicuring operations as previously described. It is to be noted at this point that with the drawer 16 extended and the closure slide 17 in its operative finger-supporting position, the light rays emanating from the lamp L will illuminate the general area of operation above the closure slide while at the same time this area is sufficiently remote from the lamp that no appreciable intensity of heat ray emanation is encountered.

From the above description it is believed that the construction, operation and many advantages of the herein-described manicure cabinet assembly will be apparent. Because of its small size when collapsed, and because of the manner in which a large variety of manicure implements and accessories may be nested in compact relationship within the cabinet, the article is admirably adapted for use by amateurs who attend to their own manicuring needs and who may carry the cabinet from room to room in the house or from place to place. It is also adapted for use by professional manicurists in hotels, for example, where the same may be carried from place to place, the assembly fulfilling all of the requirements of a complete manicuring job. In hospitals the present manicuring cabinet will supply sufficient illumination for all requirements without necessitating external illumination so that its use will not disturb nearby patients.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention what I claim as new and desire to secure by Letters Patent is:

1. In a manicure cabinet of the character described, in combination, a cabinet shell including a generally rectangular box-like structure having a bottom wall, upstanding side walls, upstanding front and rear walls respectively, and a partial top wall, the material of said partial top wall being relieved along two adjacent edges thereof to provide a generally L-shaped relief void embracing one corner of the partial top wall, and a lamp-supporting bracket of generally L-shape configuration and having a fill-in surface area conformable in size and shape to the size and shape of said relief void, a heat lamp operatively mounted on said bracket, and means movably mounting said bracket on said shell for movement between a retracted position wherein said fill-in surface area substantially fills said relief void and completes the continuity of said partial top wall of the shell and said heat lamp is disposed wholly within the confines of the shell, and an extended position wherein the heat lamp overlies the outer surface of said partial top wall so that when the heat lamp is energized heat rays emanating therefrom will be directed downwardly onto said outer surface of the top wall.

2. In a manicure cabinet of the character described, the combination set forth in claim 1 wherein the general plane of said L-shaped lamp-supporting bracket extends horizontally when the bracket is in its retracted position and wherein such plane extends vertically when the bracket is in its extended position.

3. In a manicure cabinet of the character described, the combination set forth in claim 1 wherein said generally L-shaped relief void extends substantially completely along and embraces one edge of said partial top wall so as to span the distance between said side walls, and extends only partially along and embraces only a portion of the adjacent edge of said partial top wall.

4. In a manicure cabinet of the character described, in combination, a cabinet shell including a generally rectangular box-like structure having a full rectangular bottom wall, a full upstanding generally rectangular side wall, an upstanding partial side wall, a full generally rectangular upstanding rear wall, an upstanding partial front wall, and a partial top wall, the material of said top wall being relieved along the entire edge thereof which is adjacent the partial front wall and being relieved along a portion of the edge thereof which is adjacent the full side wall so as to define a generally L-shaped relief void embracing one corner of the partial top wall, the material of said partial front wall being relieved completely along its upper edge so as to define a relief void which spans the distance between said full side wall and said partial side wall, the material of said partial side wall being relieved at the forward upper corner thereof adjacent the partial top and front walls respectively so as to define a corner relief void, and a lamp-supporting bracket assembly of generally L-shape configuration and having fill-in surface areas conformable in size and shape to the relief voids of said partial top, front and side walls respectively, means movably mounting said bracket on said shell for movement between a retracted position wherein said fill-in surface areas substantially fill said relief voids and complete the continuity of said partial top, front and side walls respectively, and an extended position wherein one leg of the generally L-shaped bracket assembly overlies the outer surface of said partial top wall, and a heat lamp operatively mounted on said bracket and movable bodily therewith, said heat lamp lying wholly within the confines of the shell when the bracket is in its retracted position and overlying the outer face of the partial top wall when the bracket is in its extended position.

5. In a manicure cabinet of the character described, the combination set forth in claim 4 and wherein the general plane of said L-shaped bracket extends horizontally when the bracket is in its retracted position and extends vertically when the bracket is in its extended position.

6. In a manicure cabinet of the character described, the combination set forth in claim 4 and wherein the general plane of said L-shaped bracket extends horizontally when the bracket is in its retracted position and extends vertically when the bracket is in its extended position, said heat lamp being of elongated cylindrical design, extending parallel to, underlying and being substantially coextensive with, said one leg of the L-shaped bracket when the latter is in its extended position.

7. In a manicure cabinet of the character described, the combination set forth in claim 4 and wherein the means for movably mounting the bracket on the shell comprises a pivotal connection between the other leg of the L-shaped bracket and the full side wall of the shell.

8. In a manicure cabinet of the character described, the combination set forth in claim 4 and wherein the means for movably mounting the bracket on the shell comprises an elongated slot in the other leg of the generally L-shaped bracket extending in the direction of the length of the leg, and a pivot pin mounted on the full side wall of the shell and projecting through said slot whereby said other leg of the bracket may be turned about the axis of said pivot pin and also shifted axially of the leg relatively to the pin in any position of angular adjustment of the other leg, and cooperating friction means on the bracket and shell for retaining the bracket in any selected position of angular and sliding adjustment on the shell.

9. In a manicure cabinet of the character described, the combination set forth in claim 8 including, additionally, detent means for releasably maintaining said bracket in its extended position.

10. In a manicure cabinet of the character described, in combination, a cabinet shell including a generally rectangular box-like structure having a full rectangular bottom wall, a full upstanding generally rectangular side wall, an upstanding partial side wall, a full generally rectangular upstanding rear wall, an upstanding partial front wall, and a partial top wall, the material of said top wall being relieved along the entire edge thereof which is adjacent the partial front wall and being relieved along a portion of the edge thereof which is adjacent the full side wall so as to define a generally L-shaped relief void embracing one corner of the partial top wall, the material of said partial front wall being relieved completely along its upper edge so as to define a relief void which spans the distance between said full side wall and said partial side wall, the material of said partial side wall being relieved at the forward upper corner thereof adjacent the partial top and front walls respectively so as to define a corner relief void, and a lamp-supporting bracket assembly of generally L-shape configuration and including first and second bracket legs respectively disposed at a right angle to each other, the first bracket leg being provided with a fill-in surface area conformable in size and shape to the portion of the relief void in said top wall which is adjacent the full side wall, the second bracket leg being provided with a fill-in surface area conformable in size and shape to the portion of the relief void in said top wall which is adjacent the partial front wall, the second bracket leg also being provided with a fill-in surface area conformable in size and shape to the relief void in the partial front wall and with a fill-in surface area conformable in size and shape to the corner relief void in the partial side wall, a heat lamp operatively mounted on said bracket, and means movably mounting said bracket on said shell for movement between a retracted position wherein said fill-in surface areas substantially fill the relief voids or portions thereof to which they are conformable in size and shape respectively, and an extended position wherein the second bracket leg overlies and is spaced from the upper surface of the partial top wall, said heat lamp being disposed entirely within the confines of said shell when said bracket is in its retracted position and being interposed between said second bracket leg and the upper surface of the partial top wall when the bracket is in its extended position.

11. In a manicure cabinet of the character described, the combination set forth in claim 10 and wherein said mounting means for the generally L-shaped bracket comprises a frictionally restrained sliding pivotal connection between said first bracket leg and the full side wall of the shell.

12. In a manicure cabinet of the character described, the combination set forth in claim 10 and wherein said mounting means for the generally L-shaped bracket comprises a frictionally restrained sliding pivotal connection between said first bracket leg and the full side wall of the shell, and cooperating detent means on said first leg of the bracket and the full side wall of the shell respectively for releasably maintaining said bracket in an extended position.

13. In a manicure cabinet of the character described, the combination set forth in claim 12 wherein said detent means comprises a vertically extending groove in said full side wall, and a detent projection on said first leg movable into cooperating register with said groove when the bracket is in an extended position.

14. In a manicure cabinet of the character described, the combination set forth in claim 10 and wherein said second bracket leg is in the form of an elongated lamp hood within which said heat lamp is nested and with which it is substantially coextensive, said hood presenting a pair of spaced side walls, a top wall and an end wall, one of said side walls of the hood presenting the first mentioned fill-in surface area of the second bracket leg, said top wall of the hood presenting the second mentioned fill-in surface area of the second bracket leg, said end wall of the hood presenting the last mentioned fill-in area of the second bracket leg.

15. In a manicure cabinet of the character described, in combination, a cabinet shell including a generally rectangular box-like structure having a full rectangular bottom wall, a full upstanding generally rectangular side wall, an upstanding partial side wall, a full generally rectangular upstanding rear wall, an upstanding partial front wall, and a partial top wall, the material of said top wall being relieved along the entire edge thereof which is adjacent the partial front wall and being relieved along a portion of the edge thereof which is adjacent the full side wall so as to define a generally L-shaped relief void embracing one corner of the partial top wall, the material of said partial front wall being relieved completely along its upper edge so as to define a relief void which spans the distance between said full side wall and said partial side wall, the material of said partial side wall being relieved at the forward upper corner thereof adjacent the partial top and front walls respectively so as to define a corner void, and a lamp-supporting bracket assembly of generally L-shape configuration and including first and second bracket legs respectively disposed at a right angle to each other, the first bracket leg being provided with a fill-in surface area conformable in size and shape to the portion of the relief void in said top wall which is adjacent the full side wall, the second bracket leg being provided with a fill-in surface area conformable in size and shape to the portion of the relief void in said top wall which is adjacent the partial front wall, the second bracket leg also being provided with a fill-in surface area conformable in size and shape to the relief void in the partial front wall and with a fill-in surface area conformable in size and shape to the corner relief void in the partial side wall, a heat lamp operatively mounted on said bracket, means movably mounting said bracket on said shell for movement between a retracted position wherein said fill-in surface areas substantially fill the relief voids or portions thereof to which they are conformable in size and shape and an extended position wherein the second bracket leg overlies and is spaced from the upper surface of the partial top wall, said heat lamp being disposed entirely within the confines of said shell when said bracket is in its retracted position and being interposed between said second bracket leg and the upper surface of the partial top wall when the bracket is in its extended position, said partial side wall being further provided with a drawer opening therein exclusive of the relief area in the same, a drawer slidable in said opening and having a front wall adapted to close the opening when the drawer is in a retracted position, and a finger support slidably disposed within the shell and adapted to be projected outwardly through the drawer opening when the drawer is in an extended position.

16. In a manicure cabinet of the character described, the combination set forth in claim 15 and wherein said finger support is provided with a series of individual finger rests thereon.

17. In a manicure cabinet of the character described, in combination, a cabinet shell having a top wall provided with a relief void therein, and a side wall having a drawer opening therein, a drawer slidable through said opening into and out of the shell and having a front wall adapted to close the drawer opening when said drawer is slid into the shell to a closed position, means within the shell defining a drawer guide, a second drawer slidable within said guide and capable of being projected outwardly through the drawer opening in the side wall, said second drawer being provided with guide means thereon, a flat generally rectangular drawer closure member slidable in said guide means and movable between a closed position wherein it overlies and closes said second drawer and an open position wherein it uncovers said second drawer, said closure member, when in closed position over said second drawer with the latter projected through the drawer opening, constituting a finger support alongside the shell and out of the realm of heat rays issuing from the heat lamp, a lamp-supporting bracket movably mounted on said shell and having a fill-in surface thereon conforming in size and shape to the size and shape of the relief void, and a heat lamp mounted on said bracket, said bracket being movable between a retracted position wherein said fill-in surface substantially fills said relief void and completes the continuity of the shell and an extended position wherein said lamp is elevated above the top wall so as to direct heat rays downwardly on said top wall.

18. In a manicure cabinet of the character described, the combination set forth in claim 17 and wherein the upper surface of said closure member is formed with a series of four shallow depressions therein, said depressions being arranged in a row along each of the two adjacent opposite side edges of the latter, said depressions constituting finger rests for the fingers of both hands during nail-treatment operations.

References Cited in the file of this patent

UNITED STATES PATENTS

| | | |
|---|---|---|
| D. 158,223 | Schubert et al. | Apr. 18, 1950 |
| 1,844,698 | Snyder | Feb. 9, 1932 |
| 1,928,035 | Snyder | Sept. 26, 1933 |
| 1,959,066 | Schmitz | May 15, 1934 |
| 2,346,234 | Reynolds | Apr. 11, 1944 |
| 2,477,921 | Batton | Aug. 2, 1949 |
| 2,676,597 | Colbert | Apr. 27, 1954 |
| 2,758,900 | Marchand | Aug. 14, 1956 |
| 2,807,515 | Dean | Sept. 24, 1957 |
| 2,826,475 | Larson | Mar. 11, 1958 |
| 2,861,578 | Thompson | Nov. 25, 1958 |